(12) United States Patent
Bedi et al.

(10) Patent No.: US 12,430,138 B2
(45) Date of Patent: Sep. 30, 2025

(54) SYSTEM LAB AND STANDARD OPERATING PROCEDURE FRAMEWORK

(71) Applicant: Zscaler, Inc., San Jose, CA (US)

(72) Inventors: Sumit Bedi, Chandigarh (IN); Mandeep Singh, Chandigarh (IN); Anoop Kumar, Chandigarh (IN); Saurabh Singla, Chandigarh (IN); Gurmeet Singh, Chandigarh (IN)

(73) Assignee: Zscaler, Inc., San Jose, CA (US)

( * ) Notice: Subject to any disclaimer, the term of this patent is extended or adjusted under 35 U.S.C. 154(b) by 39 days.

(21) Appl. No.: 17/850,274

(22) Filed: Jun. 27, 2022

(65) Prior Publication Data

US 2023/0367605 A1 Nov. 16, 2023

(51) Int. Cl.
*G06F 9/4401* (2018.01)
*H04L 41/04* (2022.01)

(52) U.S. Cl.
CPC ............ *G06F 9/4406* (2013.01); *H04L 41/04* (2013.01)

(58) Field of Classification Search
CPC .......... G06F 9/4406; G06F 9/451; G06F 9/54; H04L 41/04; H04L 63/0281; H04L 63/0442; H04L 63/20; H04L 9/0643
See application file for complete search history.

(56) References Cited

U.S. PATENT DOCUMENTS

| | | | |
|---|---|---|---|
| 8,447,851 B1 * | 5/2013 | Anderson | G06F 11/3006 709/224 |
| 9,904,534 B2 * | 2/2018 | Kuchibhotla | H04L 67/34 |
| 10,409,642 B1 * | 9/2019 | Tang | G06F 9/5005 |
| 10,678,666 B1 * | 6/2020 | Gauf | G06F 11/2635 |
| 11,347,549 B2 * | 5/2022 | Tang | G06F 9/5061 |
| 11,671,457 B2 * | 6/2023 | Yeh | H04L 63/0281 726/23 |
| 2015/0128135 A1 * | 5/2015 | Cao | G06F 9/5066 718/1 |
| 2016/0179177 A1 * | 6/2016 | Henry | G06F 13/36 713/320 |
| 2016/0350098 A1 * | 12/2016 | Kuchibhotla | G06F 8/65 |

(Continued)

OTHER PUBLICATIONS

Song, "A decision support system for application migration to the Cloud", Feb. 2013.*

(Continued)

*Primary Examiner* — Todd L Barker
(74) *Attorney, Agent, or Firm* — Baratta Law PLLC; Lawrence A. Baratta, Jr.; Ryan Odessa (57) ABSTRACT

The present disclosure relates to systems and methods for a system lab and SOP framework to support testing based on customer environments. Longevity testing must be run on every build with different test cases; thus, the system lab framework allows this testing to be performed on multiple machines in a single run, also allowing test results to be stored. The system lab framework is adapted to recreate customer issues, allowing different environments typically not accessible to be replicated and tested. The system lab framework includes central code to trigger cases on different machines. A central data collection system is able to collect all of the results from the cases and store the respective data. This system lab framework is adapted to support multiple Operating Systems (OS) including Windows, Mac, Linux, and the like.

16 Claims, 8 Drawing Sheets

(56) References Cited

U.S. PATENT DOCUMENTS

| | | | | |
|---|---|---|---|---|
| 2017/0024299 | A1* | 1/2017 | Deng | G06F 11/3414 |
| 2019/0273718 | A1* | 9/2019 | Ahuja | G06F 9/45558 |
| 2021/0055933 | A1* | 2/2021 | Bulut | G06N 20/10 |
| 2022/0353295 | A1* | 11/2022 | Yeh | H04L 63/029 |
| 2023/0297433 | A1* | 9/2023 | Mishra | G06N 7/01 |
| | | | | 718/1 |

OTHER PUBLICATIONS

Ascigil et al., "Resource Provisioning and Allocation in Function-as a Service Edge-Clouds", Jan. 18, 2021.*

Xiajong et al., "The design and implementation of resource monitoring for cloud computing service platform", Proceedings of 2013 3rd international conference on computer science and network technollogy, Oct. 12, 2013.*

* cited by examiner

SYSTEM LAB AND STANDARD OPERATING PROCEDURE FRAMEWORK

FIELD OF THE DISCLOSURE

The present disclosure relates generally to networking and computing. More particularly, the present disclosure relates to systems and methods for a system lab and Standard Operating Procedure (SOP) framework.

BACKGROUND OF THE DISCLOSURE

The use of cloud computing is growing as more enterprises and private customers adapt to a cloud resource and storage environment. Typically, there are different production clouds which handle different policies and requests from a variety of customers. In order to maintain the operation of the cloud, an operations team plays an important role in handling a large number of tickets. These tickets being the different actions which require attention in order to keep the cloud up and running smoothly. Typically, these tasks are manual and must be performed by the operations team which can be time consuming, repetitive, and requires a high level of attention from the engineers on call to quickly solve any issue which may emerge. This can result in human error, causing unnecessary delays, and in extreme circumstances, cloud outages.

BRIEF SUMMARY OF THE DISCLOSURE

The present disclosure relates to systems and methods for a system lab and SOP framework to support testing based on customer environments. Longevity testing must be run on every build with different test cases; thus, the system lab framework allows this testing to be performed on multiple machines in a single run, also allowing test results to be stored. The system lab framework is adapted to recreate customer issues, allowing different environments typically not accessible to be replicated and tested. The system lab framework includes central code to trigger cases on different machines. A central data collection system is able to collect all of the results from the cases and store the respective data. This system lab framework is adapted to support multiple Operating Systems (OS) including Windows, Mac, Linux, and the like.

In an embodiment, a non-transitory computer readable medium including instructions that, when executed, cause a processor to: read live log data associated with one or more cloud systems; and automatically performing actions to maintain the operation of the one or more cloud systems. A plurality of System Operating Procedures (SOPs) are accommodated based on different rules, conditions, and required actions. The plurality of SOPs are grouped on a basis of rules. New SOPs can be added without manual intervention. Data for the SOP and the instance is maintained and monitored on the regular basis if the actions performed have failed. All of the actions performed are stored using an issue tracker, which is created before the action, and is updated once the action is completed. The different rules that can be implemented refer to different methods that can be developed for the SOPs that are being applied. A priority is applied to the rules, regulating how the rules should be implemented. The rules are combined to create policies. Buckets are used to group similar SOPs, allowing actions to be performed in parallel on different buckets.

In another embodiment, a method includes the steps of: reading live log data associated with one or more cloud systems; and automatically performing actions to maintain the operation of the one or more cloud systems. A plurality of System Operating Procedures (SOPs) are accommodated based on different rules, conditions, and required actions. The plurality of SOPs are grouped on a basis of rules. New SOPs can be added without manual intervention. Data for the SOP and the instance is maintained and monitored on the regular basis if the actions performed have failed. All of the actions performed are stored using an issue tracker, which is created before the action, and is updated once the action is completed. The different rules that can be implemented refer to different methods that can be developed for the SOPs that are being applied. A priority is applied to the rules, regulating how the rules should be implemented. The rules are combined to create policies. Buckets are used to group similar SOPs, allowing actions to be performed in parallel on different buckets.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to systems and methods for a framework to support testing based on customer environments. Longevity testing must be run on every build with different test cases; thus, the system lab framework allows this testing to be performed on multiple machines in a single run, also allowing test results to be stored. The system lab framework is adapted to recreate customer issues, allowing different environments typically not accessible to be replicated and tested. The system lab framework includes central code to trigger cases on different machines. A central data collection system is able to collect all of the results from the cases and store the respective data. This system lab framework is adapted to support multiple Operating Systems (OS) including Windows, Mac, Linux, and the like.

§ 1.0 EXAMPLE CLOUD-BASED SYSTEM ARCHITECTURE

Figure 1:
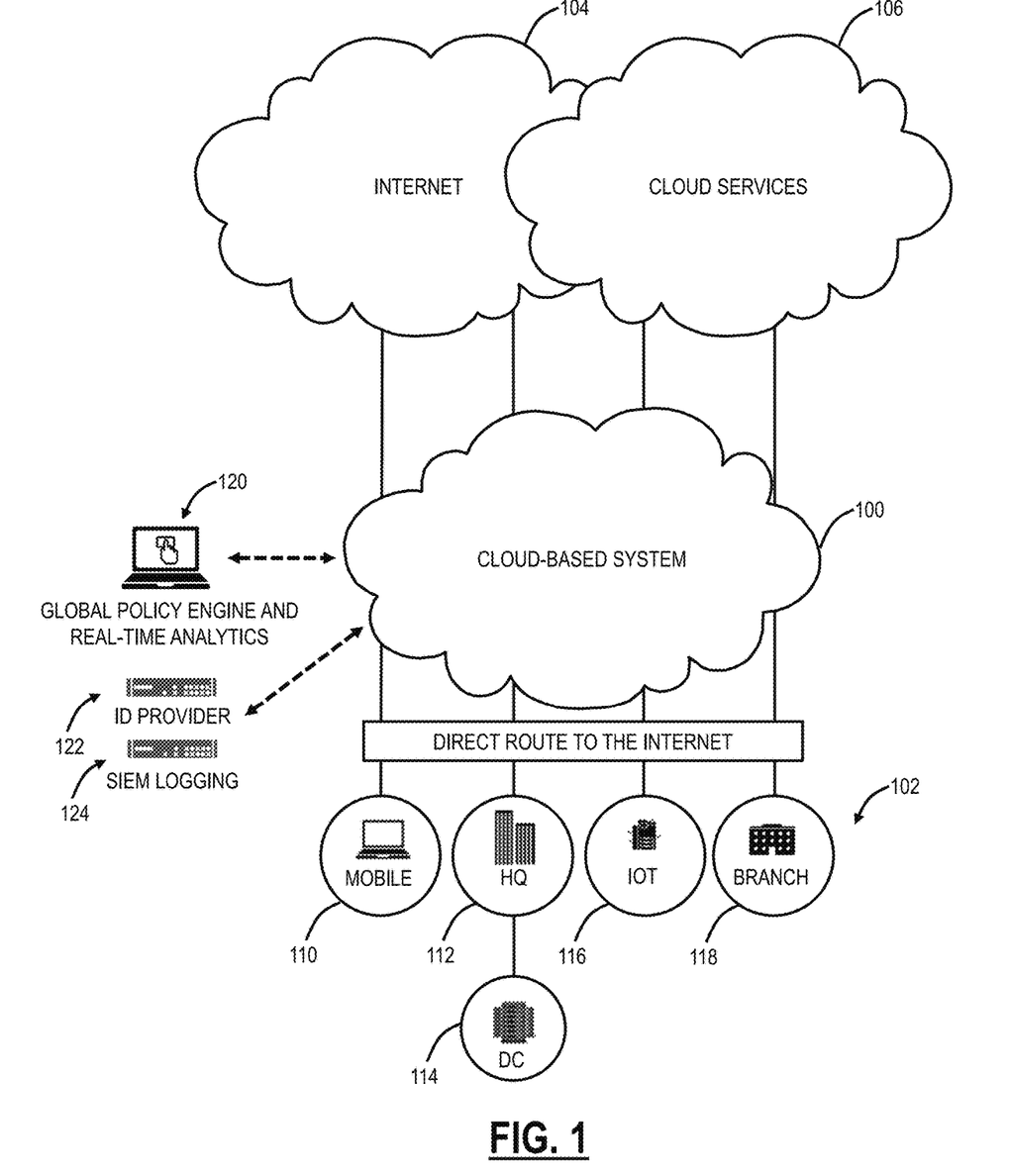
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
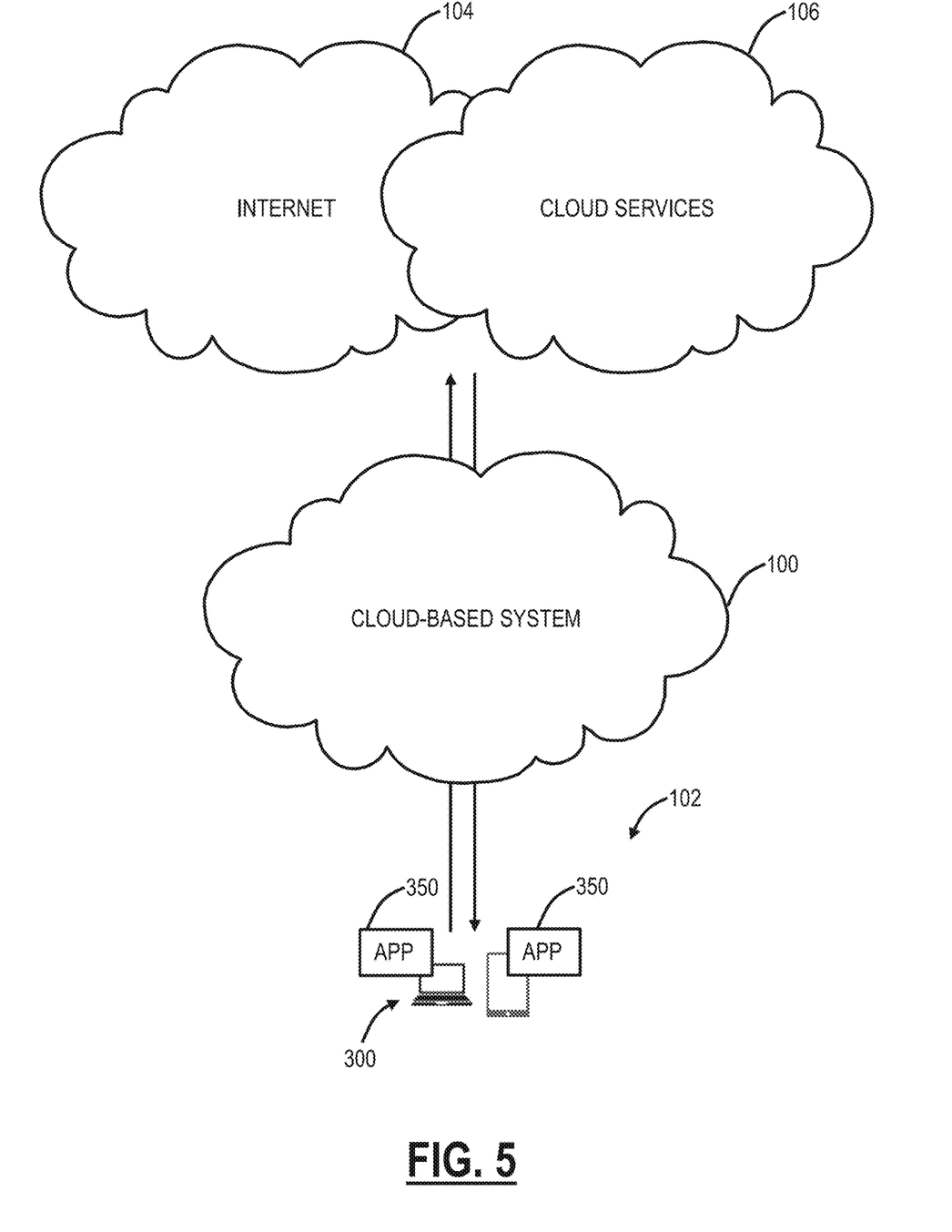
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (User Equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
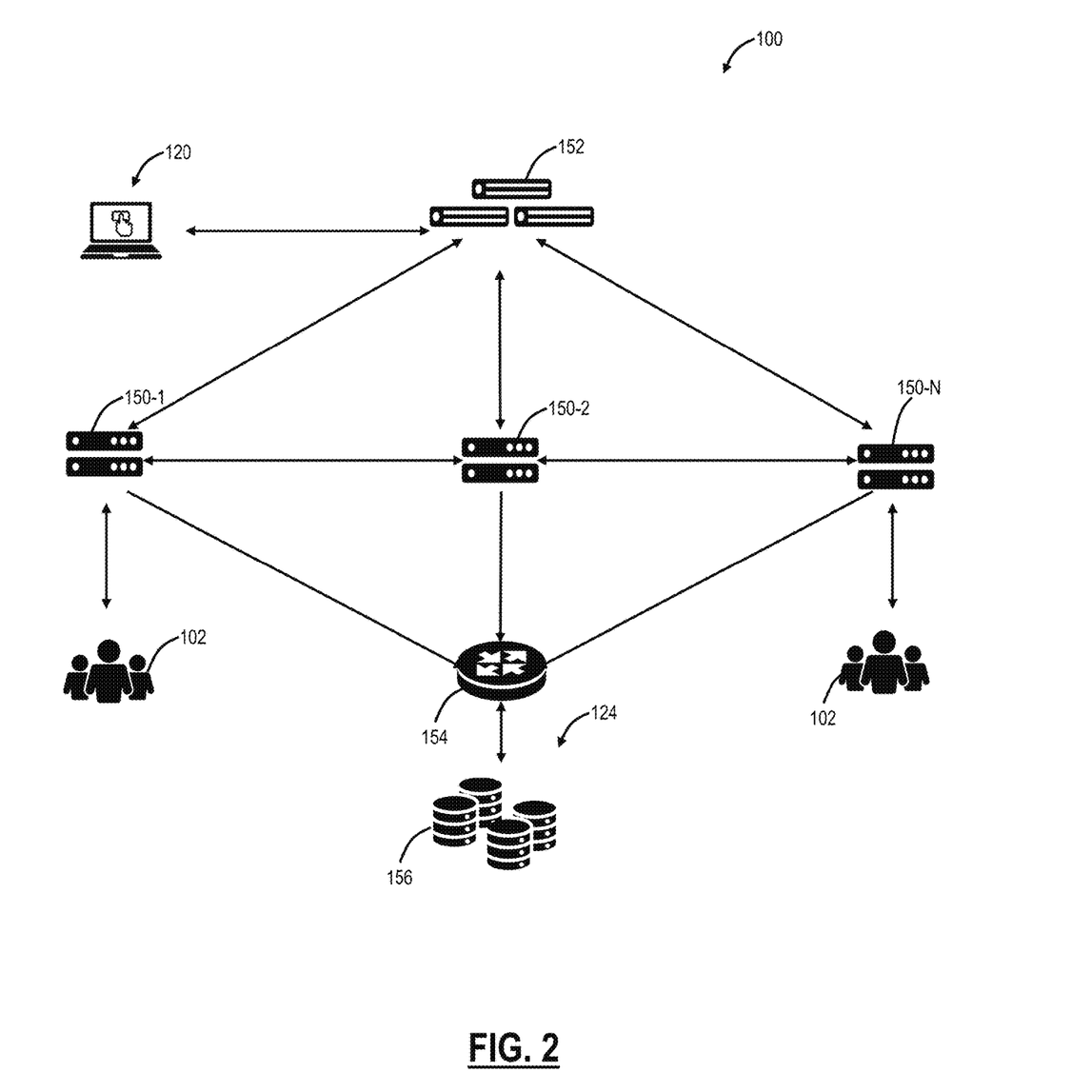
FIG. 2 is a network diagram of an example implementation of the cloud-based system.
Figure 4:
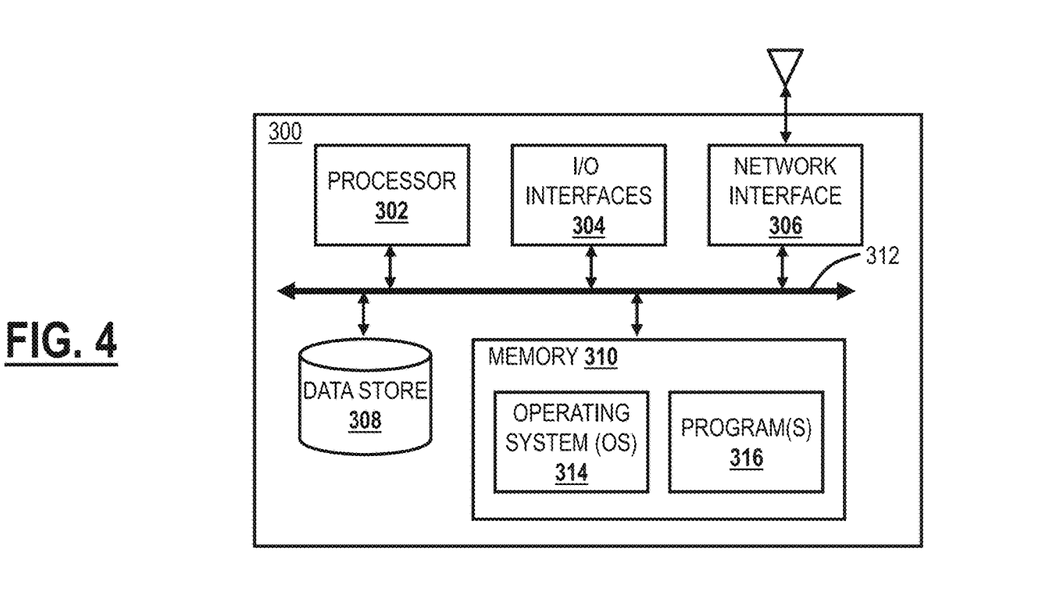

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 USER DEVICE APPLICATION FOR TRAFFIC FORWARDING AND MONITORING

Figure 3:
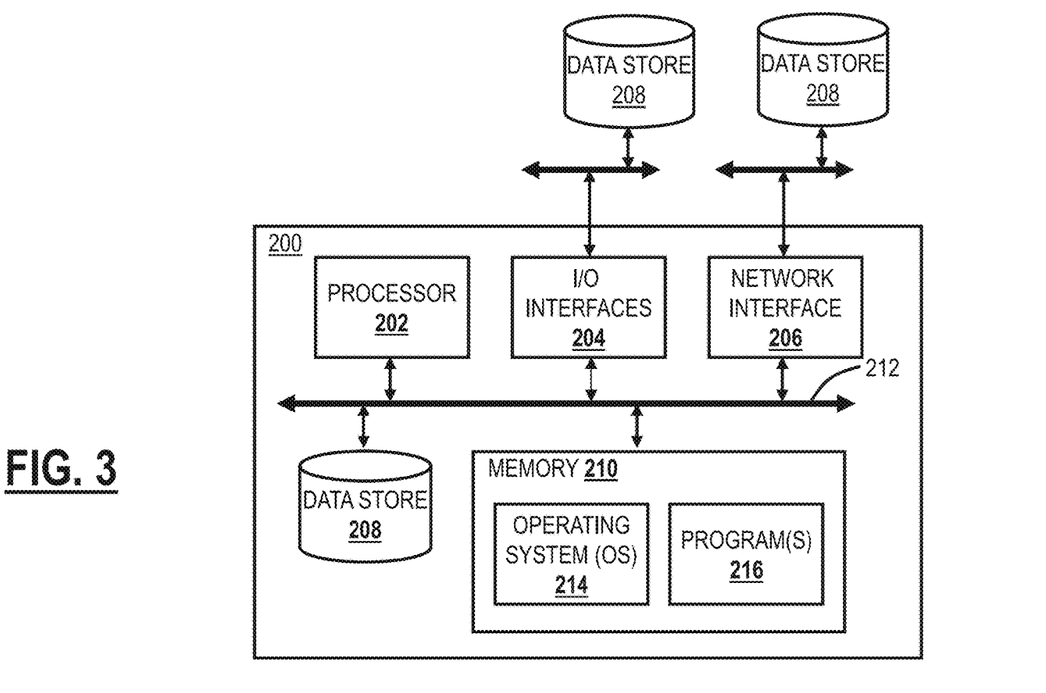

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 EXAMPLE SERVER ARCHITECTURE

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 EXAMPLE USER DEVICE ARCHITECTURE

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 ZERO TRUST NETWORK ACCESS USING THE CLOUD-BASED SYSTEM

Figure 6:
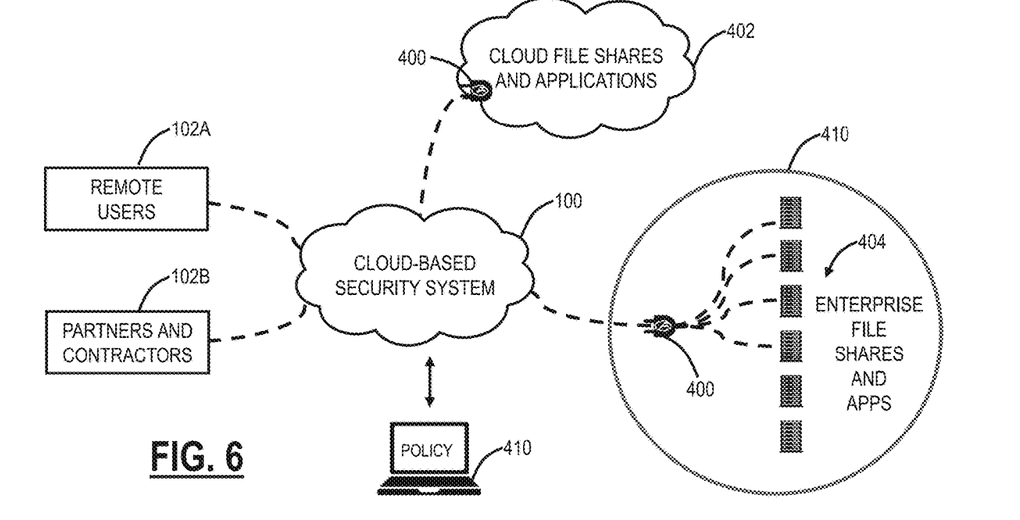
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 DIGITAL EXPERIENCE MONITORING

Figure 7:
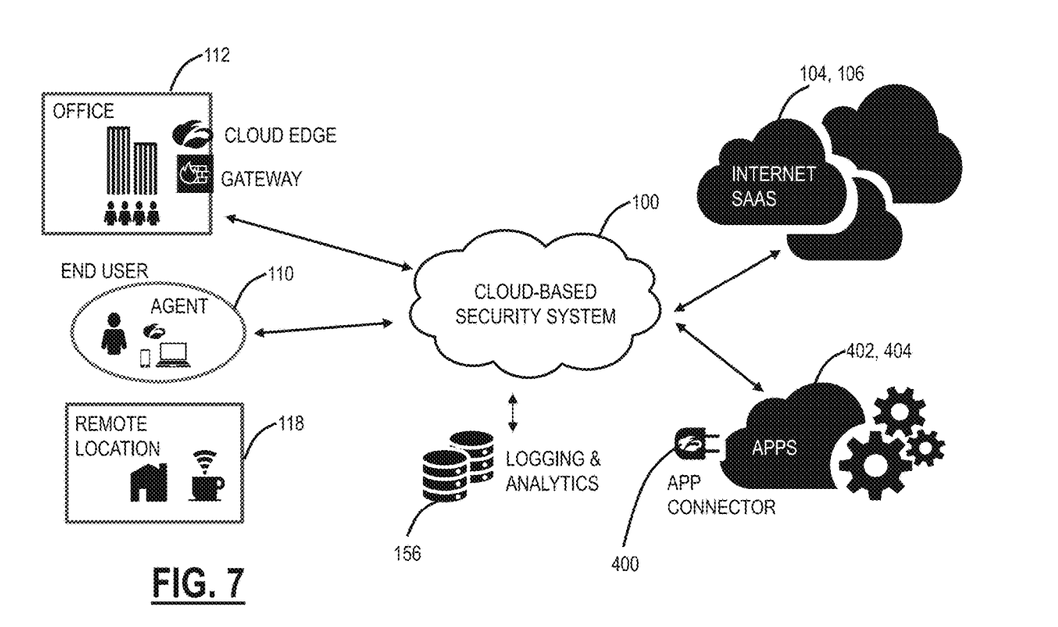
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an in-line transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 SYSTEM LAB FRAMEWORK

The present disclosure provides a system lab framework to support testing based on customer environments. Longevity testing must be run on every build with different test cases; thus, the system lab framework allows this testing to be performed on multiple machines in a single run, also allowing test results to be stored. The system lab framework is adapted to recreate customer issues, allowing different environments typically not accessible to be replicated and tested. The system lab framework includes central code to trigger cases on different machines. A central data collection system is able to collect all of the results from the cases and store the respective data. This system lab framework is adapted to support multiple Operating Systems (OS) including Windows, Mac, Linux, and the like.

The system lab framework of the present disclosure is adapted to support longevity testing, functional testing, parameter monitoring (including, but not limited to, system monitoring of cpu, memory, file handles, and rout table monitoring, etc.), replication of customer environment, and additional monitoring and functionality which can be added to the framework on the go without stopping the framework.

New devices can be linked to the system lab framework without stopping or hampering any previous runs.

In various embodiments, the system lab framework supports a plurality of different commands (including but not limited to, route monitoring, response code monitoring, cpu, memory, file handles, etc.). The framework may take action based on a plurality of outputs. For example, capturing required data in case of failure, and taking proactive steps and actions based on the data. The framework can handle a variety of outputs of any format (such as outputs in the form of strings, int, float, array, etc.). The data from all runs is saved in a central repository which is further linked to a database, which may be a database service such as Postgres, making the data available for viewing. The data from the runs may be saved in any format such as a Comma-separated Values (CSV) format. The framework may further notify a plurality of recipients periodically or in the case of an event.

§ 8.0 SOP FRAMEWORK

In order to maintain the operation of the cloud, an operations team plays an important role in handling a large number of tickets. These tickets being the different actions which require attention in order to keep the cloud up and running smoothly. Typically, these tasks are manual and must be performed by the operations team which can be time consuming, repetitive, and requires a high level of attention from the engineers on call to quickly solve any issue which may emerge. This can result in human error, causing unnecessary delays, and in extreme circumstances, cloud outages. The present disclosure provides a framework which reads live log data and can accommodate different Standard Operating Procedures (SOPs) based on different rules, conditions, and actions which may be required.

In the event that a further SOP needs to be included, there is no manual intervention required given that the configuration including the required data is updated. Such SOPs are divided on a basis of rules, for example one SOP may need to be performed only when all of the instances for a given Data Center (DC) are up and running. If different SOPs have different rules, they will be placed in different groups. If the action performed is failed, the data for the SOP and the instance is maintained and monitored on a regular basis, thus maintaining the instances in sync. All of the actions performed are stored utilizing an issue tracking system such as Jira, which is created prior to the action, and is updated once the action is completed.

Figure 8:
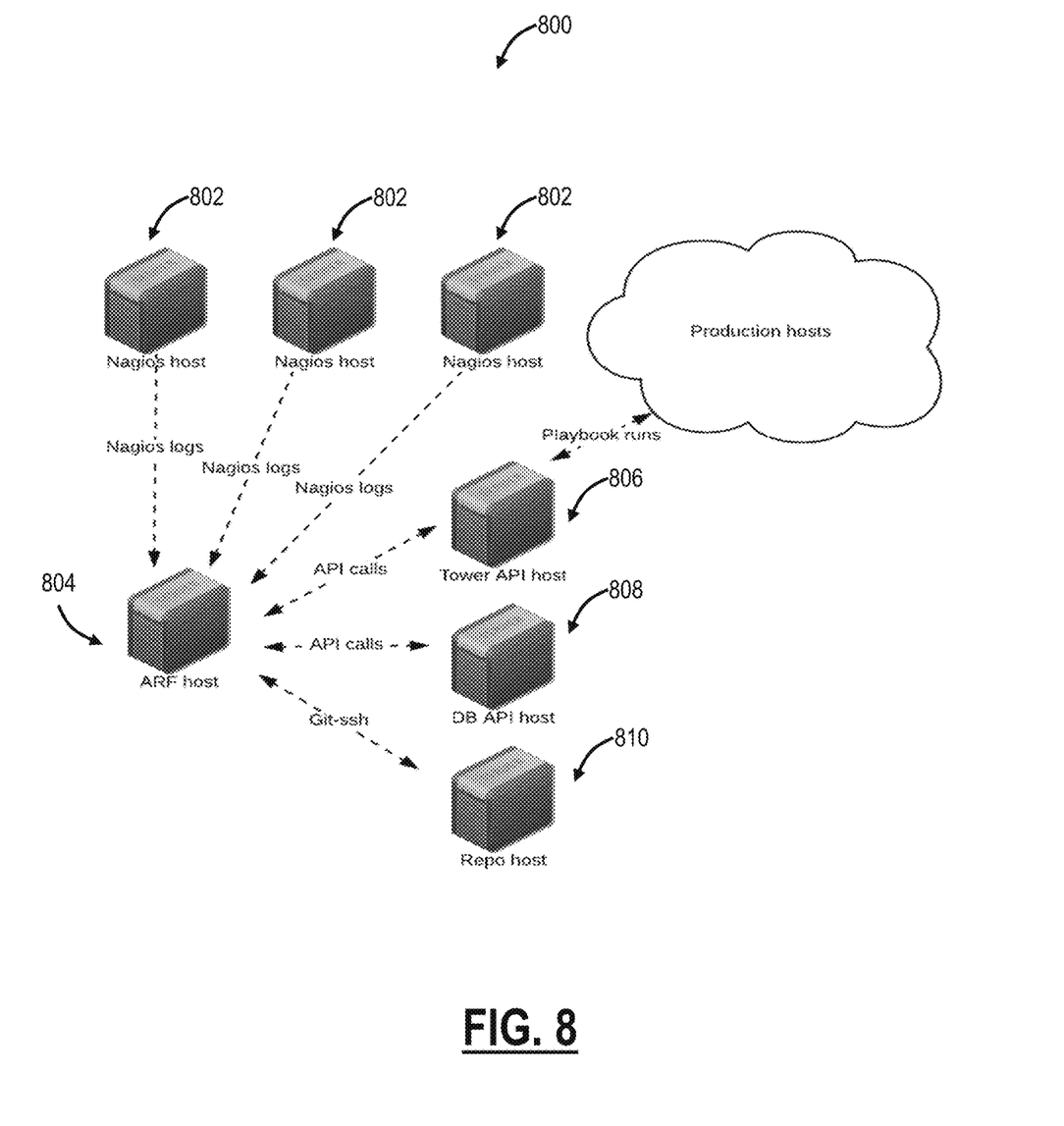
FIG. 8 is a network diagram of a production cloud utilizing the SOP framework of the present disclosure.

FIG. 8 is a network diagram of an embodiment of a production cloud 800. In the production cloud 800 the logging servers 802 illustrate the different logging servers for the production cloud 800. These logging servers may include different nodes relating to private nodes, FCC, and others of the like. The ARF host 804 is a server where all of the code and logs are synced, thus if the framework is run, it will be run on the ARF host 804. The tower API host 806 is a server where all of the playbooks are stored, which dictates the actions that are required to be taken for any SOP. The DB API host 808 is a server which maintains the information of all of the nodes for all of the production clouds 800 from where the data is received.

All of the logs from the logging servers 802 are copied to the ARF hosts 804 where the main code is stored, because the logs are written/copied in a continuous manner, the same is read from the framework. Once an SOP is received and requires action, the action is taken care of from the tower API host 806 which further interacts with the playbooks which are aligned with the current SOP. The playbook acts on the plurality of nodes, and based on the output, the framework decides whether the task has passed or failed. The host file which contains all of the node data is updated regularly from the DB API host 808.

The framework is divided into two paths, the config path, and the lib path. The config folder includes all of the configs which contain information such as the main Json file. This file includes information such as the host file, which is the file containing the information about node, instance, cloud service ip, and management ip. The main Json file further includes the log path, failed file, detailed file, Json file, and cloud name. The log path refers to the path of the log which the framework utilizes to know if any instance has failed or not. The failed file contains all of the written failed nodes. The detailed file contains all of the details corresponding to the actions taken on every node. The Json file contains all of the rules, policy, buckets, and actions to be taken on different SOPs. The cloud name refers to the production cloud for which a host file is needed, and action is required for the instances.

The main Json file is uploaded to the framework, which in turn tells the framework all of the parameters that are required by the framework. This ensures the core code is independent of the changes. The framework is responsible for reading live logs, processing data, and monitoring the failed instances, which helps keep the framework in the latest state. Different rules can be implemented, referring to the different methods that can be elaborated for the SOPs that are being tested. A priority is applied and refers to the way in which the rules should be implemented. For example, if two rules where to be applied Rule1 and Rule2, priority may be given to Rule1 and then to Rule2. A type input may be utilized and refers to where the rule is desired to be applied, for example before or after an action is taken on the concerned node. These rules can be grouped into policies, the policies being the combination of different rules that are desired.

To perform different tasks in a single run on different nodes, buckets may be utilized for grouping on the basis of SOPs and the like. When a plurality of nodes include a plurality of SOPs, this can be utilized to make the framework fast and efficient. With this feature, the SOPs in one bucket can run parallel to the SOPs in another bucket because the grouping is done in a way in which the policies of the buckets are independent.

New SOPs may be added to the framework when necessary. New SOPs are configured with a plurality of keys to align to the framework. The policy key is the combination of rules that are aligned with the given SOP and a key word is used to monitor the log file and the lines for getting the SOP, node, and conditions. The instance type is important for determining whether the node on which the actions are being taken should belong to the instance that the team is configured for. The playbook name and string which is marked as a success condition for the node to pass is included because different SOPs require different commands to be executed for the action to be performed. As previously mentioned herein, the main Lib file is responsible for all of the tasks which are reading the live logs, processing the data, and monitoring the nodes. The Json file is the file which is fed to the framework and is the file which contains all of the required data which can be changed and utilized by the framework.

Figure 9:
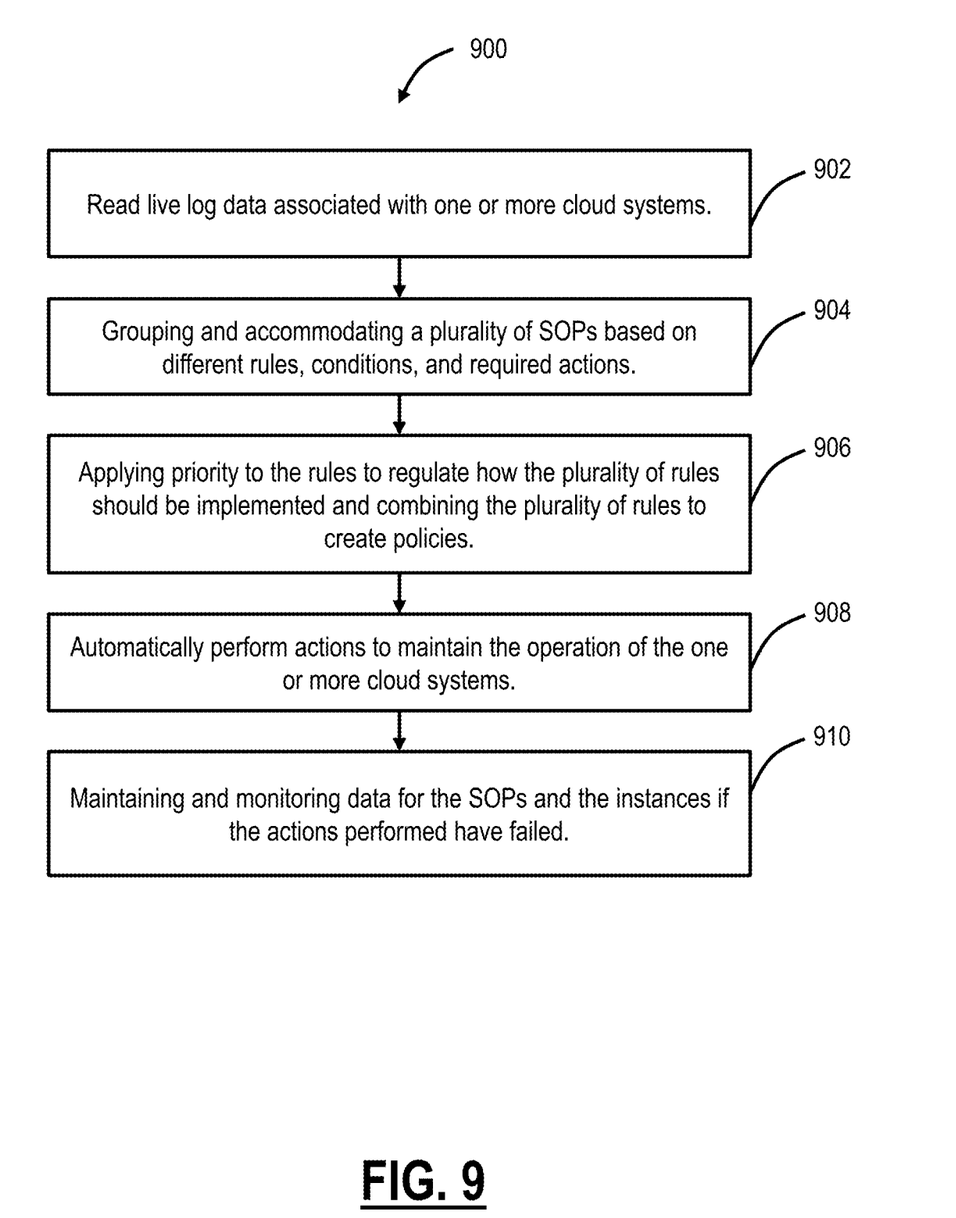
FIG. 9 is a flow diagram of a method showing the SOP framework of the present disclosure.

FIG. 9 is a flow diagram of method 900 showing the process of the SOP framework of the present disclosure. The method begins with reading 902 live log data associated with one or more cloud systems. A plurality of System Operating Procedures (SOPs) may be accommodated based on different rules, conditions, and required actions, and the plurality of SOPs can be grouped on a basis of rules 904. New SOPs can be added without manual intervention by updating the config files accordingly. All of the actions performed are stored using an issue tracker, which is created before the action, and is updated once the action is completed. The different rules that can be implemented refer to different methods that can be developed for the SOPs that are being applied, and a priority is applied to the rules, regulating how the rules should be implemented 906. The rules can further be combined to create policies, while buckets ban be used to group similar SOPs, allowing actions to be performed in parallel on different buckets. The framework then automatically performs actions to maintain the operation of the one or more cloud systems. Data for the SOP and the instance is maintained and monitored on the regular basis if the actions performed have failed 910.

§ 9.0 PROCESS

Figure 10:
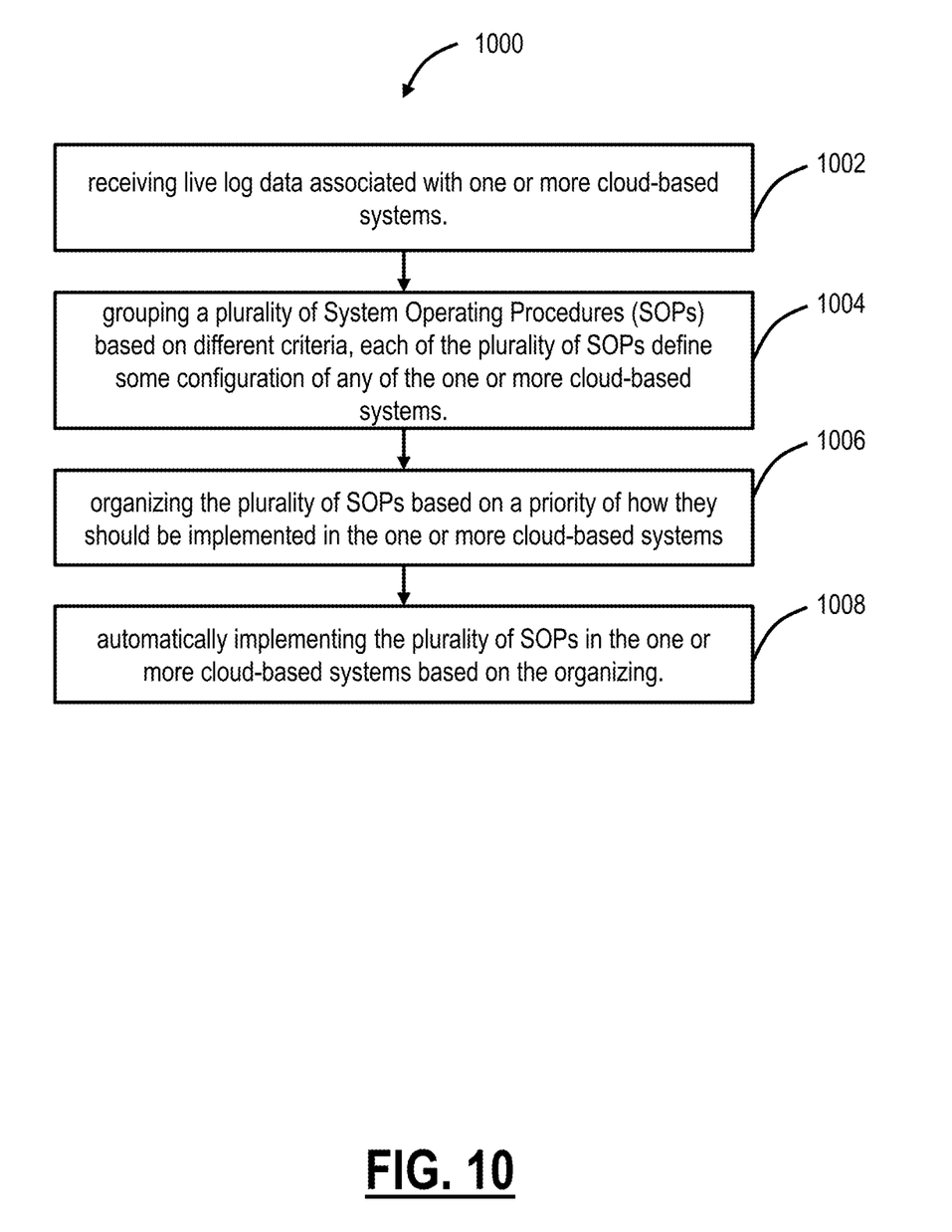
FIG. 10 is a flowchart of a process for an SOP framework.

FIG. 10 is a flowchart of a process 1000 for an SOP framework. The process 1000 includes receiving live log data associated with one or more cloud-based systems 1002; grouping a plurality of System Operating Procedures (SOPs) based on different criteria, each of the plurality of SOPs define some configuration of any of the one or more cloud-based systems 1004; organizing the plurality of SOPs based on a priority of how they should be implemented in the one or more cloud-based systems 1006; and automatically implementing the plurality of SOPs in the one or more cloud-based systems based on the organizing 1008.

The criteria can include any of rules, conditions, and required actions. The priority can be based on the criteria. Two different SOPs can be grouped together based on sharing same physical instances. Two different SOPs can be grouped separately based on having different rules. The steps can include monitoring the one or more cloud-based systems for any failures of the automatically implementing. The steps can include operating a testbed with the one or more cloud-based systems; and monitoring the operating over time for longevity testing, wherein the testbed simulates a customer environment. The testbed can support multiple different operating systems. The monitoring can include monitoring the plurality of SOPs and implementation thereof. The steps can include utilizing the testbed to recreate a customer issue on one of the one or more cloud-based systems.

§ 10.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer readable medium comprising instructions that, when executed, cause a processor to perform steps of:
receiving live log data via a framework associated with one or more cloud-based systems in a continuous manner, thereby maintaining a framework latest state of the one or more cloud-based systems, wherein the framework includes a main JSON file containing host, log, and rule information and is adapted to configure one or more System Operating Procedures (SOPs);
grouping a plurality of SOPs into one or more groups based on different criteria, wherein each of the plurality of SOPs define some configuration of any of the one or more cloud-based systems, and wherein each of the one or more groups includes SOPs which can be implemented independently of SOPs in any other group;
organizing the plurality of SOPs based on a priority of how they should be implemented in the one or more cloud-based systems;
automatically implementing the plurality of SOPs in a plurality of nodes of the one or more cloud-based systems based on the organizing, wherein the implementing includes running a plurality of SOPs in parallel;

operating a system lab testbed adapted to recreate customer environments and run longevity testing on multiple machines in a single run, wherein the system lab testbed is configured to store test results and monitor operational behavior of the one or more cloud-based systems over time;

monitoring the operating over time for longevity testing, wherein the system lab testbed simulates a customer environment; and utilizing the system lab testbed to recreate a customer issue on one of the one or more cloud-based systems by replicating customer-specific environments and executing SOPs with configuration parameters extracted from customer scenarios.

2. The non-transitory computer readable medium of claim 1, wherein the criteria includes any of rules, conditions, and required actions configured to group the SOPs.

3. The non-transitory computer readable medium of claim 1, wherein the priority is based on the criteria.

4. The non-transitory computer readable medium of claim 1, wherein two different SOPs are grouped together based on sharing same physical instances.

5. The non-transitory computer readable medium of claim 1, wherein two different SOPs are grouped separately based on having policies which can be implemented independent of one another.

6. The non-transitory computer readable medium of claim 1, wherein the steps include:
monitoring in real-time the one or more cloud-based systems for any failures of the implementing; and
maintaining data associated with any failures of the implementing.

7. The non-transitory computer readable medium of claim 1, wherein the system lab testbed supports longevity testing across multiple machines in a single run and supports multiple different operating systems including Windows, Mac, and Linux.

8. The non-transitory computer readable medium of claim 1, wherein the monitoring includes monitoring the execution status of the plurality of SOPs and the operational state of nodes on which the SOPs are implemented including detecting failed actions and updating an issue tracker in response to the results.

9. A method comprising steps of:
receiving live log data via a framework associated with one or more cloud-based systems in a continuous manner, thereby maintaining a framework latest state of the one or more cloud-based systems wherein the framework includes a main JSON file containing host, log, and rule information and is adapted to configure one or more System Operating Procedures (SOPs);

grouping a plurality of SOPs into one or more groups based on different criteria, wherein each of the plurality of SOPs define some configuration of any of the one or more cloud-based systems, and wherein each of the one or more groups includes SOPs which can be implemented independently of SOPs in any other group;

organizing the plurality of SOPs based on a priority of how they should be implemented in the one or more cloud-based systems;

automatically implementing the plurality of SOPs in a plurality of nodes of the one or more cloud-based systems based on the organizing, wherein the implementing includes running a plurality of SOPs in parallel;

operating a system lab testbed adapted to recreate customer environments and run longevity testing on multiple machines in a single run, wherein the system lab testbed is configured to store test results and monitor operational behavior of the one or more cloud-based systems over time;

monitoring the operating over time for longevity testing, wherein the system lab testbed simulates a customer environment; and utilizing the system lab testbed to recreate a customer issue on one of the one or more cloud-based systems by replicating customer-specific environments and executing SOPs with configuration parameters extracted from customer scenarios.

10. The method of claim 9, wherein the criteria includes any of rules, conditions, and required actions.

11. The method of claim 9, wherein the priority is based on the criteria.

12. The method of claim 9, wherein two different SOPs are grouped together based on sharing same physical instances.

13. The method of claim 9, wherein two different SOPs are grouped separately based on having policies which can be implemented independent of one another.

14. The method of claim 9, wherein the steps include:
monitoring the one or more cloud-based systems for any failures of the implementing; and
maintaining data associated with any failures of the implementing.

15. The method of claim 9, wherein the system lab testbed supports longevity testing across multiple machines in a single run and supports multiple different operating systems including Windows, Mac, and Linux.

16. The method of claim 9, wherein the monitoring includes monitoring the execution status of the plurality of SOPs and the operational state of nodes on which the SOPs are implemented, including detecting failed actions and updating an issue tracker in response to the results.

* * * * *